(12) United States Patent
Stec

(10) Patent No.: US 11,985,300 B2
(45) Date of Patent: May 14, 2024

(54) MEASUREMENT OF AN IMAGE SENSOR POINT SPREAD FUNCTION (PSF)

(71) Applicant: FotoNation Limited, Galway (IE)

(72) Inventor: Piotr Stec, Galway (IE)

(73) Assignee: FotoNation Limited (IE)

( * ) Notice: Subject to any disclaimer, the term of this patent is extended or adjusted under 35 U.S.C. 154(b) by 247 days.

(21) Appl. No.: 17/405,398

(22) Filed: Aug. 18, 2021

(65) Prior Publication Data

US 2022/0060681 A1    Feb. 24, 2022

Related U.S. Application Data

(60) Provisional application No. 63/067,551, filed on Aug. 19, 2020.

(51) Int. Cl.
    *H04N 17/02*     (2006.01)
    *G06T 7/80*      (2017.01)
    *H04N 17/00*     (2006.01)
    *H04N 23/80*     (2023.01)

(52) U.S. Cl.
    CPC .......... *H04N 17/002* (2013.01); *G06T 7/80* (2017.01); *H04N 23/80* (2023.01); *G06T 2207/20056* (2013.01)

(58) Field of Classification Search
    CPC .... H04N 17/002; H04N 5/23229; G06T 7/80; G06T 2207/20056
    USPC ......................................................... 348/187
    See application file for complete search history.

(56) References Cited

U.S. PATENT DOCUMENTS

| | | | | |
|---|---|---|---|---|
| 8,854,707 | B2* | 10/2014 | DiCarlo | H04N 17/002 |
| | | | | 358/406 |
| 8,923,644 | B2* | 12/2014 | Kim | G06T 5/003 |
| | | | | 382/255 |
| 10,162,433 | B2* | 12/2018 | Wang | G06F 3/03543 |
| 10,281,698 | B2* | 5/2019 | Singer | G02B 21/0076 |

OTHER PUBLICATIONS

Lee, Jisoo, et al., "Characterization and deblurring of lateral crosstalk in CMOS image sensors," Article in IEEE Transactions on Electron Devices, Jan. 2004, downloaded Aug. 18, 21 from https://www.researchgate.net/publication/3065410, 9 pages.
Georgiev, Todor, et al., "Interferometric Measurement of Sensor MTF and Crosstalk," Society for Imaging Science and Technology, 2017, downloaded Aug. 18, 2021 from https://doi.org/10.2352/ISSN.2470-1173.2017.15.DPMI-079, 6 pages.
Lu, Min, et al., "Online 3D Displacement Measurement Using Speckle Interferometer with a Single Illumination-Detection Path," Sensors, MDPI, May 15, 2018, Published Jun. 13, 2018, downloaded from www.mdpi.com/journal/sensors, 14 pages.
Chen, Xi, et al., "Sensor modulation transfer function measurement using band-limited laser speckle," 2008 Optical Society of America, Published Nov. 20, 2008, 13 pages.

* cited by examiner

*Primary Examiner* — Trang U Tran
(74) *Attorney, Agent, or Firm* — Lerner David LLP

(57) ABSTRACT

Techniques and arrangements that utilize speckle imaging and autocorrelation to estimate the PSF of an image sensor for a digital imaging apparatus, e.g., a camera or a scanner. In particular, a system of components described herein is a simple arrangement that does not require a complex setup. Therefore, the system is portable and easy to set up. Additionally, by utilizing autocorrelation, the calculations of PSF using data obtained by the system are simplified.

20 Claims, 5 Drawing Sheets

MEASUREMENT OF AN IMAGE SENSOR POINT SPREAD FUNCTION (PSF)

PRIORITY CLAIM AND CROSS-REFERENCE TO RELATED APPLICATIONS

This Application is a non-provisional of, and claims priority under 35 USC § 119(e), to U.S. Provisional Patent Application No. 63/067,551, filed, Aug. 19, 2020, which is fully incorporated by reference herein as if fully set forth below.

BACKGROUND

Digital imaging apparatuses, such as cameras, generally include a lens. A lens' point spread function (PSF) is an important measurement for how sharp an image captured and produced by a digital imaging apparatus may be. Digital imaging apparatuses generally also include an image sensor. An ideal image sensor's response to excitation of a single input pixel would be a signal on the single output image pixel at the corresponding location. If the response of the pixels surrounding the pixel being excited is non-zero, it means that the image sensor does not have a perfect impulse sampling response. The shape of the real image sensor's sampling response function is also known as the Point Spread Function (PSF). An image sensor with a wider PSF will result in less sharp images captured and produced by an imaging apparatus that includes the image sensor. Thus, the PSF of the image sensor will be the limiting factor of the final resolution of the imaging apparatus, not only the sampling rate of the image sensor. This relaxes the requirements regarding the resolution of the lens used in conjunction with the image sensor below the Nyquist frequency. Typically, resolution of the lens is associated with the manufacturing cost. Knowing if the requirements regarding the lens resolution can be relaxed is beneficial to the manufacturer of the imaging apparatus. In other words, the lens or the image sensor with the widest PSF is the limiting factor for the sharpness of images produced by the imaging apparatus. Knowing the image sensor's PSF allows for better prediction of the complete imaging apparatus behavior by combining the designed lens PSF with the sensor PSF. It also allows for setting the upper performance limit for the lens as there is no point in improving the lens performance when the limiting factor is the image sensor's PSF.

In particular, the upper resolution limit of the image sensor is dependent on the pixel pitch. However, the image sensor can introduce a loss of resolution on its own. This especially happens when there is a substantial level of a signal cross talk among pixels of the image sensor. This is generally a known problem with image sensors and is dependent on wavelength of the light and the pixel technology used. Thus, the resolution loss introduced by the image sensor may not be equal for all the wavelengths of light. For example, the image sensor resolution loss caused by the pixel cross talk may be negligible in the visible light spectrum. However, the loss of resolution of images captured by the imaging apparatus may be more apparent in other light spectrums, e.g., infrared (IR). Simply put, if one illuminates one pixel, pixels surrounding that pixel react, i.e. cross talk among the pixels. This results in the final image captured and produced by the imaging apparatus being less sharp comparing one captured on an imaging apparatus without pixel cross talk. Therefore, it is important to characterize how much blur is introduced by the image sensor since there is no sense in using a lens that will outperform the image sensor, in terms of resolution, as the final system resolution of the imaging apparatus will be limited by the image sensor.

Generally, there are two primary methods for measuring PSF introduced by an image sensor. These methods generally utilize very cumbersome arrangements that require large amounts of equipment and require precise alignment among the various pieces of equipment.

In a first approach described in "Characterization and Deblurring of Lateral Crosstalk in CMOS Image Sensors", Ji Soo Lee et. al., a single pixel is illuminated. Using a microscope lens, a laser light is produced through the lens. Multiple microscopes are needed in order to provide a precise illumination of the pixel. Furthermore, the calculations are complex.

In a second approach described in "Sensor modulation transfer function measurement using band-limited laser speckle", Xi Chen et. al., band limited speckle imaging is utilized. This approach also requires very precise equipment arrangements along with complex calculations to measure an image sensor's modulation transfer function (MTF), which is related to the image sensor's PSF. A circular opal milk glass diffuser illuminated by a 5 mW He—Ne laser and a linear polarizer may be used to generate band-limited speckle on the image sensor. The power spectral density cut-off frequency of the speckle is chosen to be twice that of the sensor Nyquist frequency by placing the image sensor at the specific Z location along the optical axis. For the speckle input, the power spectral density at the image sensor is calculated using the Rayleigh-Sommerfeld integral and then the output power spectral density for the speckle pattern captured by the image sensor is measured. With this data, the two-dimensional image sensor modulation transfer function (MTF) is calculated.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with respect to each other.

DETAILED DESCRIPTION

Overview

Figure 1:
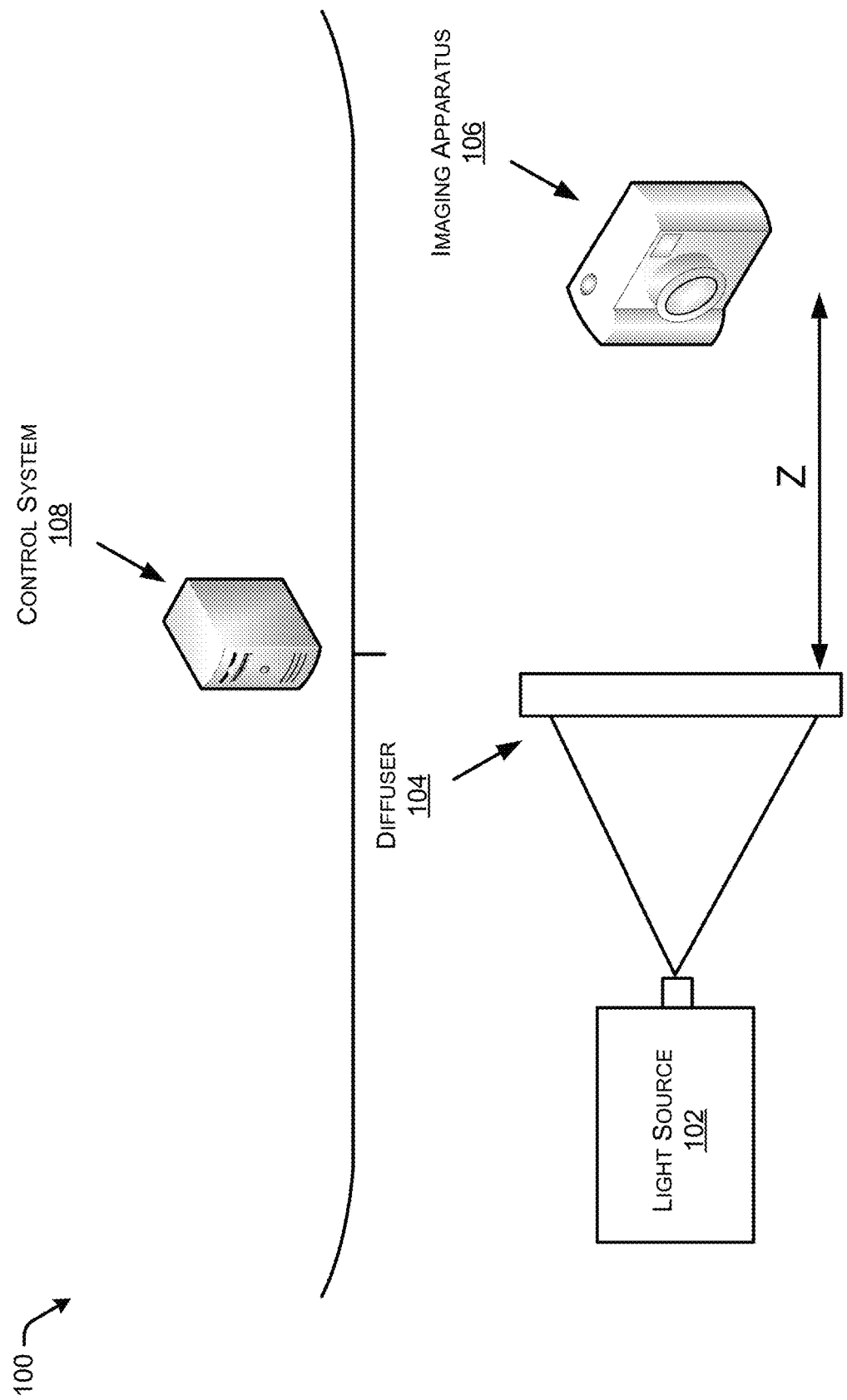
FIG. 1 schematically illustrates a system for measuring and/or estimating PSF of an image sensor.

This disclosure provides techniques and arrangements that utilize laser speckle imaging and autocorrelation to estimate the PSF of an image sensor for a digital imaging apparatus, e.g., a camera. In particular, a system of components, in accordance with embodiments, is a simple arrangement that does not require a complex setup. Therefore, the system is portable and easy to set up. Additionally, by utilizing autocorrelation, the calculations of PSF using data obtained by the system are simplified.

As is known, PSF describes the response of an imaging apparatus, e.g., the apparatus' various components such as a lens, an image sensor, etc., to a point source or point object. A more general term for the PSF is an apparatus' impulse response, the PSF being the impulse response of a focused optical system. The PSF in many contexts can be thought of as the extended "blob" in an image that represents a single point object. In functional terms, it is the spatial domain version of the optical transfer function of the imaging apparatus. It is a useful concept in Fourier optics, astronomical imaging, medical imaging, electron microscopy and other imaging techniques such as 3D microscopy (like in confocal laser scanning microscopy) and fluorescence microscopy.

The degree of spreading (blurring) of the point object is a measure for the quality of an imaging apparatus. In non-coherent imaging apparatuses, such as fluorescent microscopes, telescopes or optical microscopes, the image formation process is linear in the image intensity and described by linear system theory. This means that when two objects A and B are imaged simultaneously, the resulting image is equal to the sum of the independently imaged objects. In other words: the imaging of A is unaffected by the imaging of B and vice versa, owing to the non-interacting property of photons. In space-invariant systems, i.e. the PSF is the same everywhere in the imaging space, the image of a complex object is then the convolution of the true object and the PSF.

Autocorrelation, also known as serial correlation, is the correlation of a signal with a delayed copy of itself as a function of delay. Informally, it is the similarity between observations as a function of the time lag between them. The analysis of autocorrelation is a mathematical tool for finding repeating patterns, such as the presence of a periodic signal obscured by noise or identifying the missing fundamental frequency in a signal implied by its harmonic frequencies. It is often used in signal processing for analyzing functions or series of values, such as time domain signals.

In embodiments, white noise is fed to the system by a light source, e.g., a laser light source. The image sensor is excited with laser speckles. The system thus includes a light source, which in embodiments is a laser light source, and the aperture includes a diffuser. The lens on the imaging apparatus may or may not be included when exciting a pixel of the image sensor and thus, the imaging apparatus does not need to be disassembled, e.g., the camera does not need to be disassembled. This is because the PSF of the lens does not affect the PSF of the image sensor. Thus, the lens does not affect the PSF of the image sensor.

Accordingly, in embodiments, a method of determining point spread function (PSF) of an image sensor for an imaging apparatus includes generating, by a laser light source, a laser signal. The laser signal is directed through a diffuser toward a pixel of the image sensor. Based on the laser signal, the pixel is excited in order to generate an image. Based on the pixel intensity values of the image, the PSF is calculated via auto correlation of the pixel intensity values.

In accordance with embodiments, the PSF may be calculated via autocorrelation by performing autocorrelation of the pixel intensity values in the spatial domain.

In accordance with other embodiments, the PSF may be calculated via autocorrelation by performing autocorrelation of the pixel intensity values in the frequency domain. In such embodiments, a fast Fourier transform of the pixel intensity values of the image may be performed. A magnitude of the fast Fourier transform is calculated and an inverse Fourier transform of the magnitude is then calculated. Additionally, in such embodiments, the image may be windowed prior to calculating the PSF.

In embodiments, a system for calculating PSF of an image sensor may include a light source, e.g., a divergent laser light source that provides a divergent laser signal. A diffuser may be included and light from the light source may be directed through the diffuser towards the image sensor of an imaging apparatus, e.g., a camera. The distance Z between the diffuser and the sensor plane generally should be small enough that the generated speckle pattern of the image is smaller than the pixel size. The resulting image should look like a pure noise type image. Generally, it is possible to generate an image pattern with speckles smaller than a pixel size that moves the frequency band of the excitation of the pixel beyond the Nyquist frequency of the sensor.

Example Embodiments

FIG. 1 schematically illustrates a system 100 for measuring and/or estimating PSF of an image sensor. The system 100 may include a light source 102, which in some embodiments comprises a laser light source. In such embodiments, the laser light source may be a divergent laser light source that provides a divergent laser signal.

The system 100 may further include a diffuser 104 between the light source 102 and the image sensor 106. In embodiments, the diffuser 104 may be part of the light source 102. In embodiments, the image sensor 106 is part of a digital imaging apparatus, e.g., a digital camera. When measuring PSF of the image sensor 106, the digital imaging apparatus 106 may or may not include a lens (not illustrated). The image sensor 106 is a distance Z from the diffuser 104. The system 100 also includes a control system 108 that operates the system 100.

In embodiments, the measurement of PSF of the image sensor 106 is based on the assumption that pixels of the image sensor 106 may be excited with a wide-band random signal. It is important that the maximum signal frequency exceeds the image sensor's Nyquist frequency. Such conditions may be achieved using laser speckle imaging.

Thus, in embodiments, a laser speckle pattern produced by the light source 102 is used as the excitation signal. It is possible to generate a pattern with speckles smaller than a pixel size of pixels of the image sensor 106 that moves the frequency band of the excitation beyond the Nyquist frequency of the image sensor 106. The distance Z between the diffuser 104 and the image sensor 106 should be small enough that the generated speckle pattern is smaller than the pixel size. Thus, in embodiments, the light source 102 is configured to create a sufficiently large spot of light that generates a required speckle size of the image. In particular, the light source 102 may include optical elements that allow control of a light spot size on a surface of the diffuser 104.

Figure 2B:
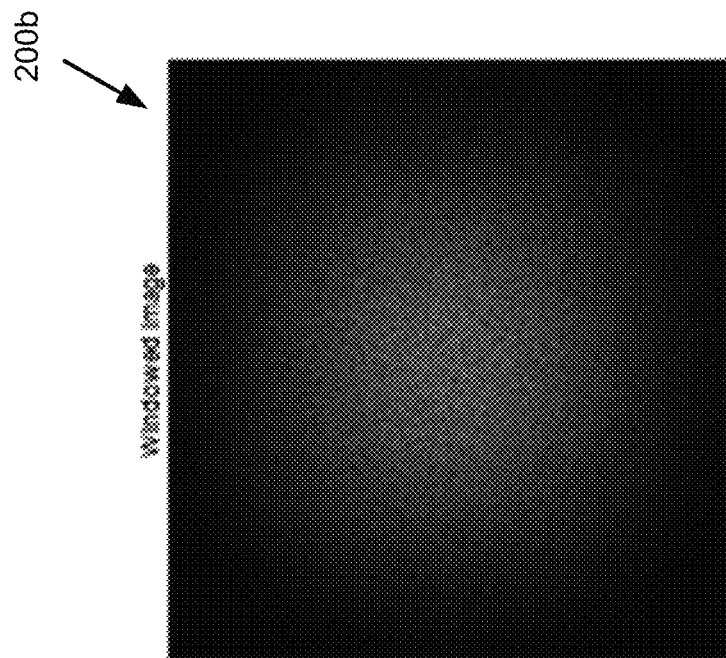
FIG. 2B illustrates an example of the image of FIG. 2A windowed by the system of FIG. 1 for use in measuring and/or estimating PSF of an image sensor, such as the image sensor of FIG. 1.
Figure 2A:
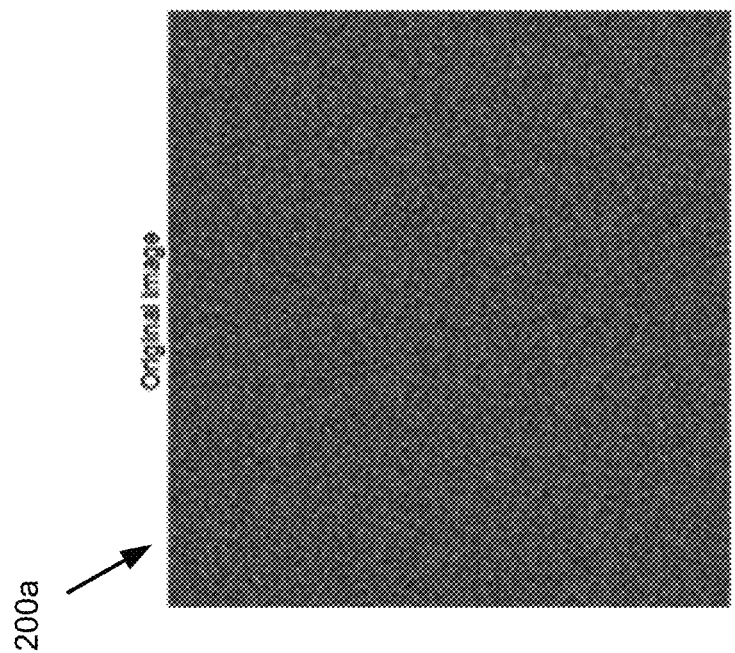
FIG. 2A illustrates an example image produced by the system of FIG. 1 for use in measuring and/or estimating PSF of an image sensor, such as the image sensor of FIG. 1.

As can be seen in FIG. 2A, the resulting image 200 appears as pure noise. The image 200 may be displayed on a display of the control system 108.

In embodiments, the light source 102 generates a light signal, e.g., a divergent laser light signal that is directed through the diffuser 104 toward a pixel of the image sensor 106. The light signal excites the pixel resulting in the image 200a of FIG. 2A. The control system 108 measures pixel intensity values of the image 200a. Autocorrelation may be used to calculate a PSF value of the image sensor 106 based on pixel intensity values of the image 200a.

Figure 3:
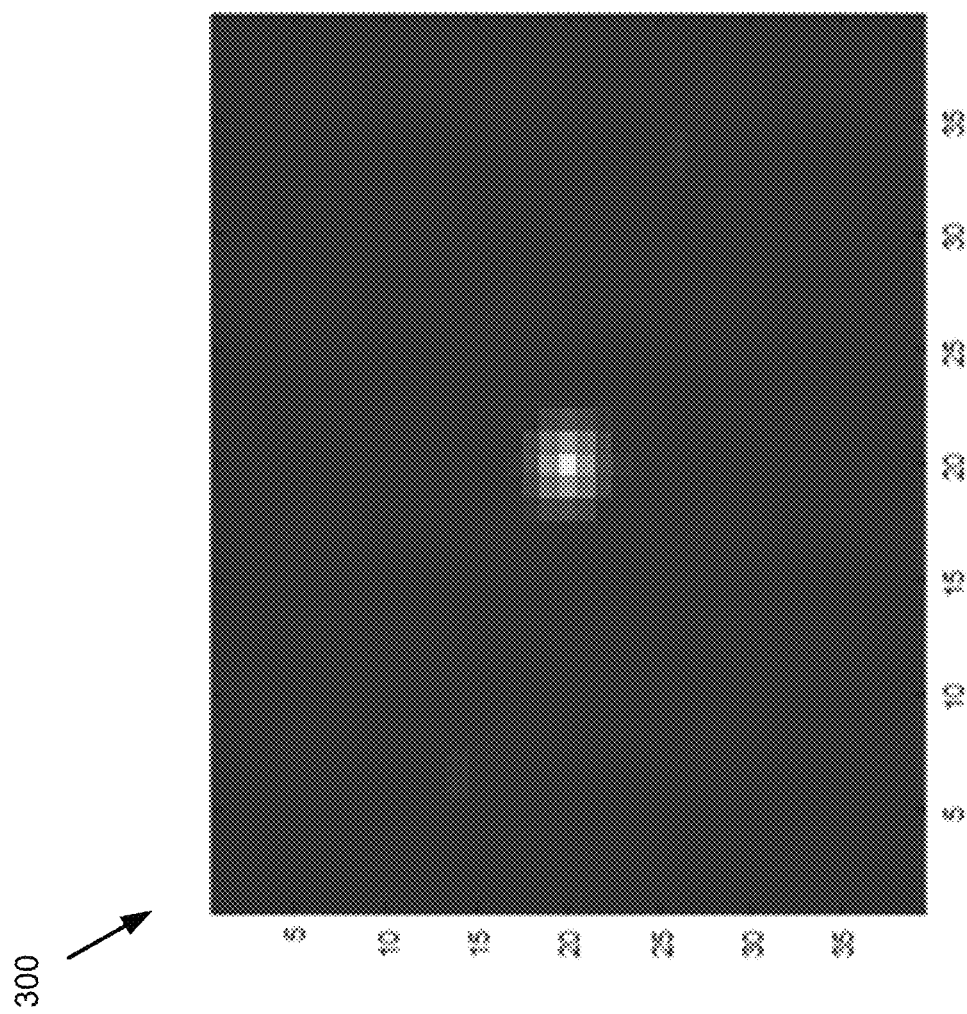
FIG. 3 illustrates an example central crop of the normalized PSF calculated by the system of FIG. 1 from the images of FIGS. 2A and 2B.

In embodiments, the pixel intensity values of the image 200a may be used to calculate the PSF using autocorrelation in the spatial domain. In other embodiments, the pixel intensity values of the image 200a may be used to calculate the PSF using autocorrelation in the frequency domain. In such embodiments, input image I (image 200a) may be elementwise multiplied with a windowing function w that may prevent the injection of high frequency components during calculation of the Fourier transform: $I_w=Iw$. FIG. 2B illustrates the windowed image 200b. The control system 108 thus measures pixel intensity values of the windowed image 200b as opposed to image 200a. The PSF may be calculated by taking the fast Fourier transform of the windowed image 200b, calculating a magnitude of the transform and then calculating inverse Fourier transform: PSF=IFFT($|FFT(I_w)|$). The resulting PSF may be shifted by half the image size in both directions as all the information is accumulated in the corners due to taking the magnitude of the Fourier transform and discarding the phase information. In embodiments, the resulting PSF may then be normalized to range [0,1]. The central crop of the normalized PSF is illustrated in FIG. 3. In embodiments, the term $|FFT(I_w)|$ is averaged over multiple samples before calculating the IFFT in order to minimize the noise influence. For obtaining the multiple samples, either the window location may be changed within the image or the window location remains the same and the pixel intensity values are obtained from multiple different images. Thus, the measurements are repeated under changing parameters and then the results are averaged to provide an average PSF.

Figure 4:
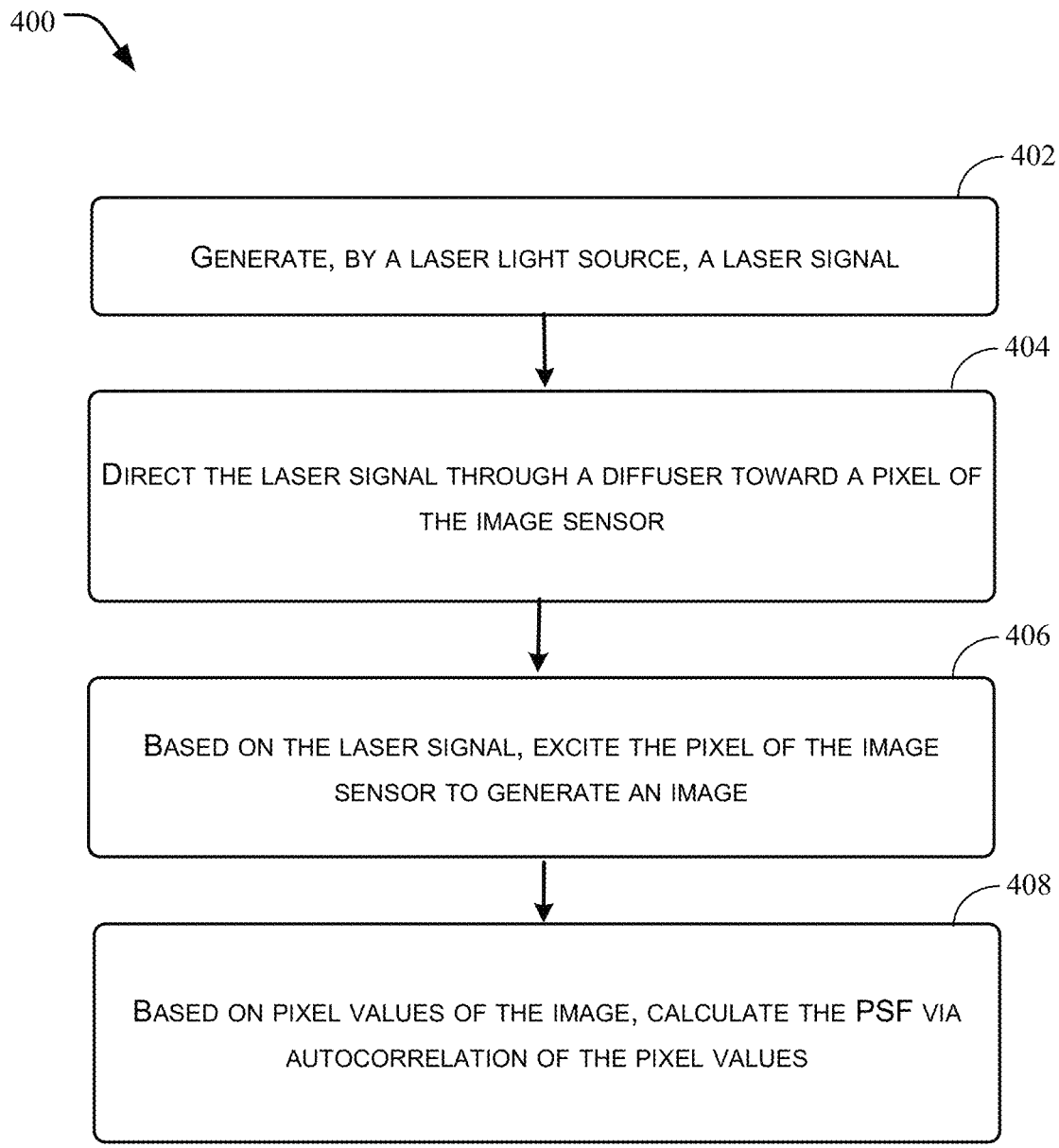
FIG. 4 illustrates a flow diagram of an example method for measuring and/or estimating the PSF of an image sensor, such as the image sensor of FIG. 1.

FIG. 4 illustrates a flow diagram of an example method 400 for measuring and/or estimating the PSF of an image sensor, e.g., image sensor 106. In the flow diagram, the operations of method 400 are shown as individual blocks.

At block 402, a laser light source generates a laser signal. For example, the light source 102 may generate the laser signal.

At block 404, the laser signal is directed through a diffuser toward a pixel of the image sensor. For example, the laser signal may be directed through the diffuser 104 toward a pixel of the image sensor 106.

At block 406, based on the laser signal, the pixel of the image sensor may be excited to generate an image. For example, a pixel of the image sensor 106 may be excited and produce image 200a.

At block 408, based on pixel intensity values of the image, the PSF may be calculated via autocorrelation of the pixel intensity values. For example, the PSF may be calculated by the control system 108 via autocorrelation of the pixel intensity values.

Figure 5:
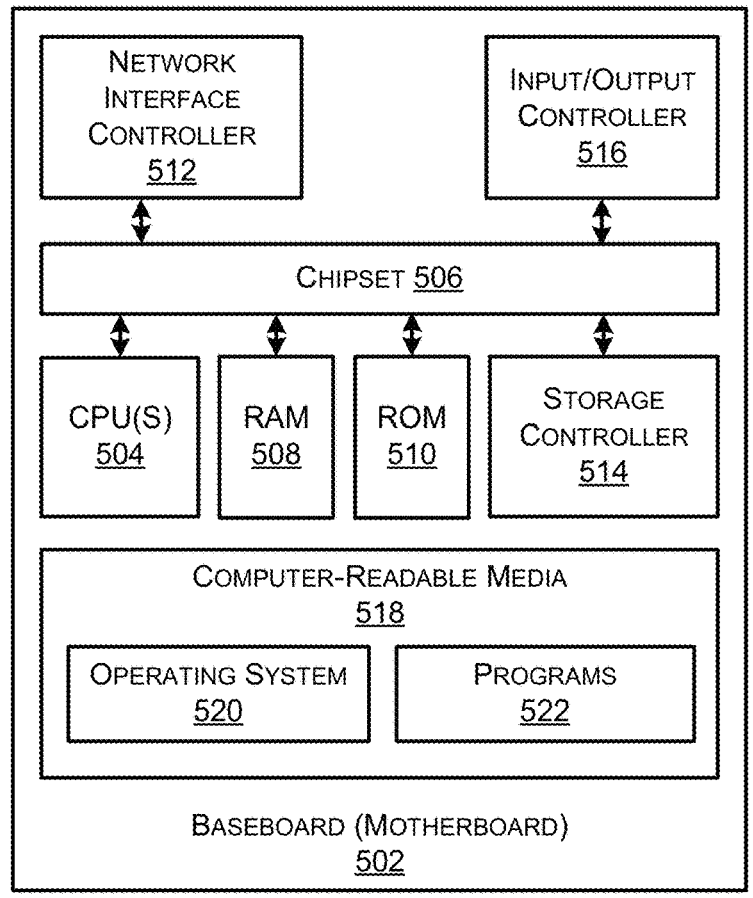
FIG. 5 is a computer architecture diagram showing an illustrative computer hardware architecture for implementing one or more elements of a communication network that can be utilized to implement aspects of the various technologies and techniques presented herein.

FIG. 5 schematically illustrates an example computer architecture for a computer or computing system 500 capable of executing program components for implementing at least some of the functionality described above, e.g., the functionality of the control system 108. The computer 500 shown in FIG. 5 may comprise a conventional server computer, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative embodiment, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the embodiments described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description.

Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a display that is part of the computer 500, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The programs 522 may comprise any type of programs or processes to perform the techniques described in this disclosure for managing workloads in compute clusters comprising compute nodes by managing the workloads at the resource level of the compute clusters. Generally, the programs 522 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of determining point spread function (PSF) of an image sensor for an imaging apparatus, the method comprising:
   generating, by a laser light source, a laser signal;
   directing the laser signal through a diffuser toward a pixel of the image sensor;
   based on the laser signal, exciting the pixel of the image sensor to generate an image, wherein a frequency band of the excitation is beyond the image sensor's Nyquist frequency;
   multiplying pixel intensity values of the image with a windowing function;
   performing a fast Fourier transform of the multiplied pixel intensity values of the image; and
   calculating the PSF via autocorrelation of the transformed pixel intensity values.

2. The method of claim 1, wherein calculating the PSF based on pixel intensity values of the image via autocorrelation of the pixel intensity values comprises performing autocorrelation of the pixel intensity values in the spatial domain.

3. The method of claim 1, wherein calculating the PSF based on pixel intensity values of the image via autocorrelation of the pixel intensity values comprises performing autocorrelation of the pixel intensity values in the frequency domain.

4. The method of claim 3, wherein performing autocorrelation of the pixel intensity values in the frequency domain comprises:
calculating a magnitude of the fast Fourier transform; and
calculating an inverse Fourier transform of the magnitude.

5. The method of claim 4, further comprising:
prior to calculating the PSF, windowing the image.

6. The method of claim 1, wherein the laser light source is configured to create a sufficiently large spot of light on the diffuser that generates a required speckle size of the image.

7. The method of claim 6, wherein the laser signal is a divergent laser signal.

8. The method of claim 1, wherein the laser light source includes optical elements that allow control of a light spot size on a surface of the diffuser.

9. The method of claim 1, further comprising:
normalizing the PSF to [0,1].

10. The method of claim 1, further comprising:
determining a plurality of PSF values under different parameters; and
calculating an average PSF value of the image sensor.

11. A system for determining point spread function (PSF) of an image sensor for an imaging apparatus, the system comprising:
a light source;
a diffuser between the light source and the light source; and
a control system, wherein the control system is configured to cause the system to perform actions comprising:
generating a laser signal;
directing the laser signal through a diffuser toward a pixel of the image sensor;
based on the laser signal, exciting the pixel of the image sensor to generate an image, wherein a frequency band of the excitation is beyond the image sensor's Nyquist frequency;
multiplying pixel intensity values of the image with a windowing function;
performing a fast Fourier transform of the multiplied pixel intensity values of the image; and
calculating the PSF via autocorrelation of the transformed pixel intensity values.

12. The system of claim 11, wherein calculating the PSF based on pixel intensity values of the image via autocorrelation of the pixel intensity values comprises performing autocorrelation of the pixel intensity values in the spatial domain.

13. The system of claim 11, wherein calculating the PSF based on pixel intensity values of the image via autocorrelation of the pixel intensity values comprises performing autocorrelation of the pixel intensity values in the frequency domain.

14. The system of claim 13, wherein performing autocorrelation of the pixel intensity values in the frequency domain comprises:
calculating a magnitude of the fast Fourier transform; and
calculating an inverse Fourier transform of the magnitude.

15. The system of claim 14, wherein the actions further comprise:
prior to calculating the PSF, windowing the image.

16. The system of claim 11, wherein the light source is configured to create a sufficiently large spot of light that generates a required speckle size of the image.

17. The system of claim 16, wherein the laser signal is a divergent laser signal.

18. The system of claim 11, wherein the light source includes optical elements that allow control of a light spot size on a surface of the diffuser.

19. The system of claim 11, wherein the actions further comprise:
normalizing the PSF to [0,1].

20. The system of claim 11, wherein the actions further comprise:
determining a plurality of PSF values under different parameters; and
calculating an average PSF value of the image sensor.

* * * * *